(12) United States Patent
Ueta

(10) Patent No.: US 10,873,214 B2
(45) Date of Patent: Dec. 22, 2020

(54) CONNECTOR AND POWER SUPPLY SYSTEM

(71) Applicant: Yazaki Corporation, Tokyo (JP)

(72) Inventor: Keisuke Ueta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 1 day.

(21) Appl. No.: 16/394,449

(22) Filed: Apr. 25, 2019

(65) Prior Publication Data

US 2019/0333694 A1 Oct. 31, 2019

(30) Foreign Application Priority Data

Apr. 27, 2018 (JP) .................. 2018-086550

(51) Int. Cl.
| | |
|---|---|
| *H02J 50/10* | (2016.01) |
| *H02J 50/12* | (2016.01) |
| *H01F 38/14* | (2006.01) |
| *H01R 13/66* | (2006.01) |
| *H02J 5/00* | (2016.01) |
| *H04B 5/00* | (2006.01) |

(52) U.S. Cl.
CPC .............. *H02J 50/10* (2016.02); *H01F 38/14* (2013.01); *H01R 13/6633* (2013.01); *H02J 5/005* (2013.01); *H02J 50/12* (2016.02); *H04B 5/0037* (2013.01)

(58) Field of Classification Search
CPC . H01F 38/14; H02J 50/12; H02J 5/005; H02J 50/005; H02J 50/80; H01R 13/6633; H04B 5/0037
See application file for complete search history.

(56) References Cited

U.S. PATENT DOCUMENTS

| | | | |
|---|---|---|---|
| 2002/0121417 A1 | 9/2002 | Guettler | |
| 2012/0175969 A1* | 7/2012 | Maughan | ............... H01F 38/14 307/104 |
| 2015/0188608 A1 | 7/2015 | Kondo | |
| 2015/0364931 A1* | 12/2015 | Ren | ........................ H02J 50/10 307/104 |
| 2016/0268041 A1 | 9/2016 | Deville et al. | |
| 2018/0102213 A1* | 4/2018 | Hanabusa | ............. H01F 27/306 |

FOREIGN PATENT DOCUMENTS

JP      2015-103771 A      6/2015

* cited by examiner

*Primary Examiner* — Carlos Amaya
(74) *Attorney, Agent, or Firm* — Sughrue Mion, PLLC

(57) ABSTRACT

A connector to be applied to a power supply system includes: a first connector main body having a first power transmission coil, a first signal transmission coil, and a first case; and a second connector main body having a second power transmission coil, a second signal transmission coil, and a second case. In the first connector main body and the second connector main body, the first case and the second case are relatively rotatable about a rotation axis along a fitting direction with a positional relation that the first power transmission coil and the second power transmission coil are opposed to each other and the first signal transmission coil and the second signal transmission coil are opposed to each other in a state in which the first case and the second case are mutually fitted.

4 Claims, 4 Drawing Sheets

CONNECTOR AND POWER SUPPLY SYSTEM

CROSS-REFERENCE TO RELATED APPLICATION(S)

The present application claims priority to and incorporates by reference the entire contents of Japanese Patent Application No. 018-066550 filed in Japan on Apr. 27, 2018.

BACKGROUND OF THE INVENTION

1. Field of the Invention

The present invention relates to a connector and a power supply system.

2. Description of the Related Art

As a conventional connector applied to a power supply system, for example, Japanese Patent Application Laid-open No. 2015-103771 discloses a non-contact connector in which substrates provided with coils are embedded in housings of a plug and a receptacle, respectively, and the corresponding coils are opposed to each other in a non-contact manner. In the non-contact connector, the housing of the plug is in elastic contact with the housing of the receptacle in the direction of the coil of the receptacle in the state in which the housing of the plug is inserted and fitted into the housing of the receptacle.

The non-contact connector disclosed in Japanese Patent Application Laid-open No. 2015-103771 has a room for further improvement in assemblability, for example.

SUMMARY CF THE INVENTION

The present invention has been made in view of the above-mentioned circumstances, and it is an object thereof to provide a connector and a power supply system capable of improving assemblability.

A connector according to one aspect of the present invention includes a first connector main body including a first power transmission coil capable of transmitting electric power in a non-contact manner, a first signal transmission coil capable of transmitting a signal in a non-contact manner, and a first case in which the first power transmission coil and the first signal transmission coil are provided; and a second connector main body including a second power transmission coil capable or transmitting electric power to and from the first power transmission coil in a non-contact manner, a second signal transmission coil capable of transmitting a signal to and from the first signal transmission coil in a non-contact manner, and a second case in which the second power transmission coil and the second signal transmission coil are provided and which is fittable into the first case, wherein in the first connector main body and the second connector main bony, the first case and the second case are relatively rotatable about a rotation axis along a fitting direction with a positional relation that the first power transmission coil and the second power transmission coil are opposed to each other and the first signal transmission coil and the second signal transmission coil are opposed to each other in a state in which the first case and the second case are mutually fitted.

According to another aspect of the present invention, in the connector, one of the first case and the second case may have a fitting recess formed into a columnar shape having a center axis that is the rotation axis, and the other of the first case and the second case may be formed into a cylindrical shape which is fittable to the fitting recess and have a center axis that is the rotation axis.

According to still another aspect of the present invention, in the connector, the one of the first case and the second case may be the first case, the other of the first case and the second case may be the second case, and the second connector main body may include a magnetic member provided to the second case and located between the second power transmission coil and the second signal transmission coil in the fitting direction.

A power supply system according to still another aspect of the present invention includes a master-side device, which is a supply source of electric power; a slave-side device, which is a supply destination of electric power from the master-side device; and a connector configured to connect the master-side device and the slave-side device, wherein the connector includes: a first connector main body including a first power transmission coil capable of transmitting electric power in a non-contact manner, a first signal transmission coil capable of transmitting a signal in a non-contact manner, and a first case in which the first power transmission coil and the first signal transmission coil are provided, the first connector main body being provided on one side of the master-side device and the slave-side device; and a second connector main body including a second power transmission coil capable of transmitting electric power to and from the first power transmission coil in a non-contact manner, a second signal transmission coil capable of transmitting a signal to and from the first signal transmission coil in a non-contact manner, and a second case in which the second power transmission coil and the second signal transmission coil are provided, the second connector main body being provided on the other side of the master-side device and the slave-side device, and in the first connector main body and the second connector main body, the first case and the second case are relatively rotatable about a rotation axis along a fitting direction with a positional relation that the first power transmission coil and the second power transmission coil are opposed to each other and the first signal transmission coil and second signal transmission coil are opposed to each other in a state which the first case and the second case are mutually fitted.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 3:
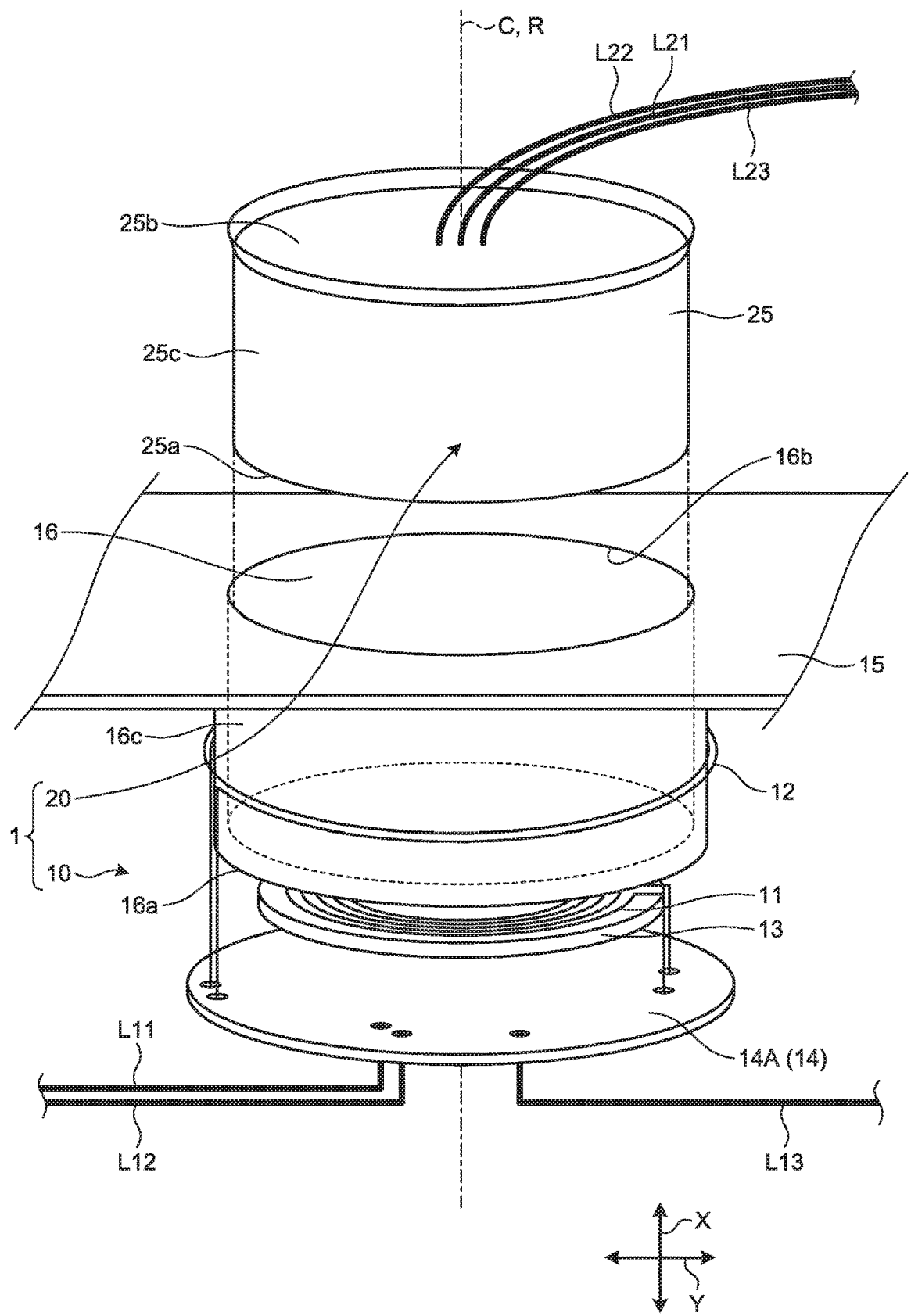
FIG. 3 is a schematic exploded perspective view illustrating a schematic configuration of the connector included in the power supply system according to the embodiment.
Figure 4:
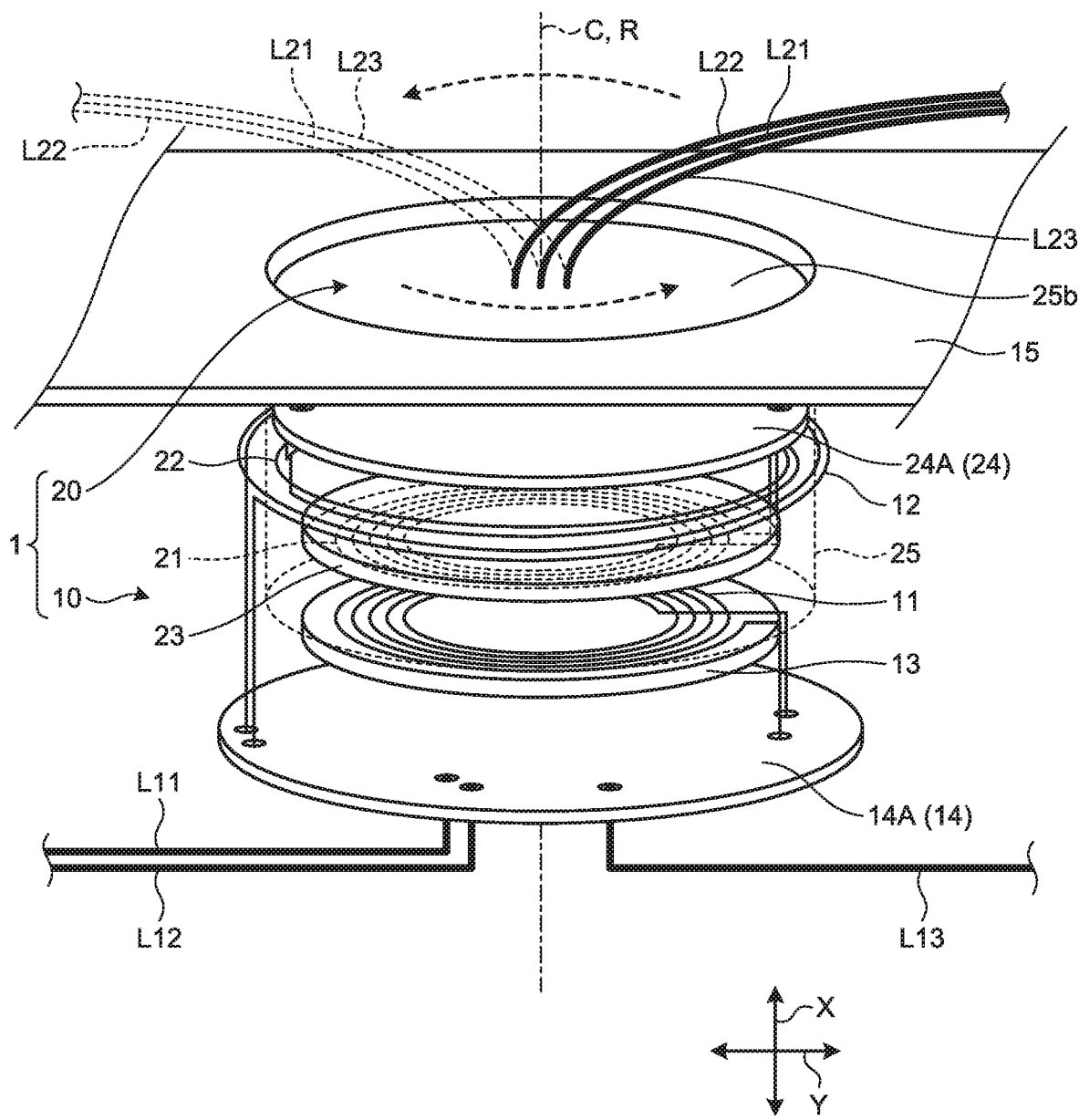
FIG. 4 is a schematic perspective view illustrating a schematic configuration of the connector included in the power supply system according to the embodiment.

An embodiment according to the present invention is described in detail below with reference to the accompanying drawings. The present invention is not limited by the embodiment. Components in the following embodiment include the ones that can be replaced by a person skilled in the art and the ones that are substantially the same. In FIG. 3 and FIG. 4, the illustration of a part of a first case is omitted.

Embodiment

Figure 1:
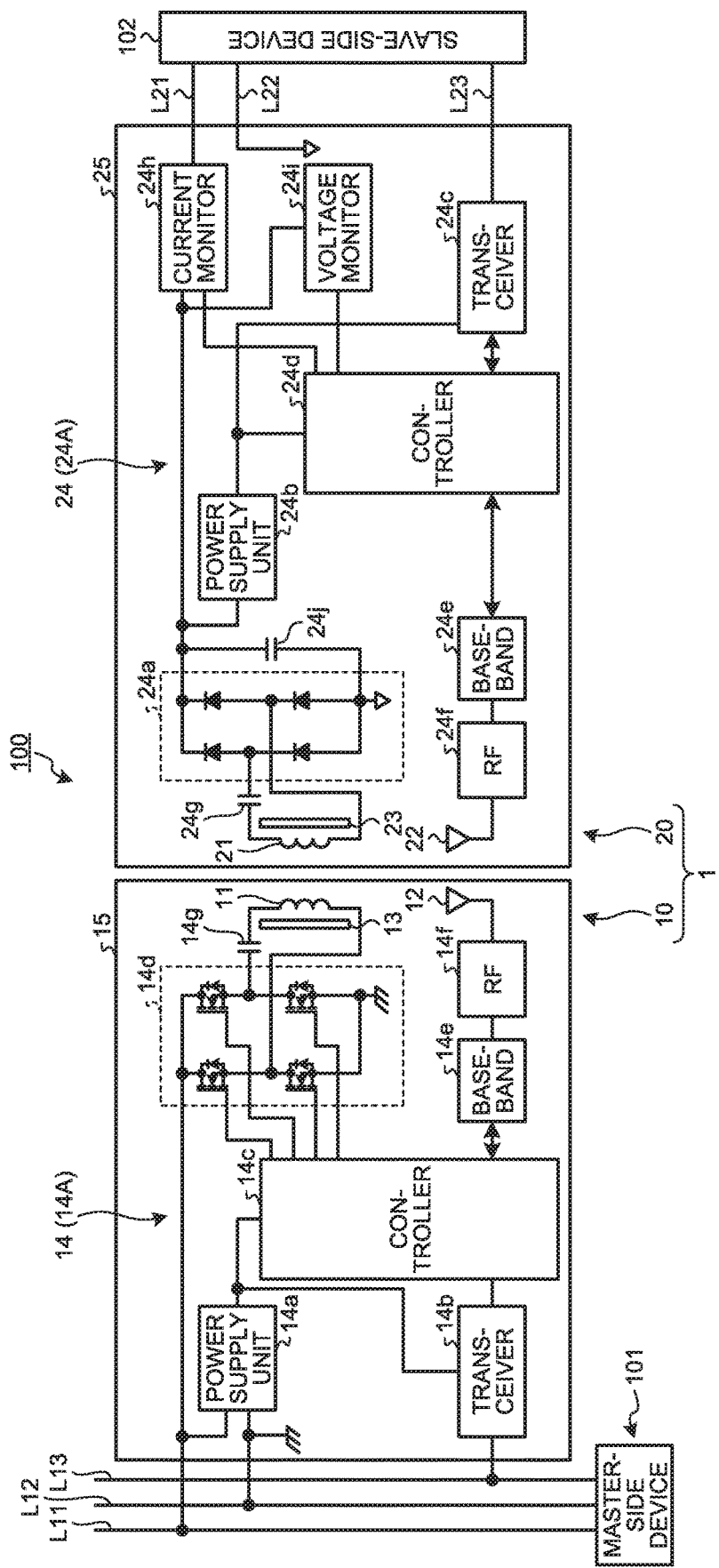
FIG. 1 is a schematic block diagram illustrating a schematic configuration of a power supply system according to an embodiment.

A connector 1 according to the present embodiment illustrated in FIG. 1 is applied to a power supply system 100. The power supply system 100 is a wireless power feeding system capable of non-contact power transmission in which at least a part of the power supply system 100 performs wireless communication when transmitting electric power from a power source to various electric loads. The power supply system 100 in the present embodiment transmits both of electric power and signals between devices on the power source side and devices on the electric load side in a non-contact manner. The connector 1 constitutes a non-contact connector configured to connect devices on the power source side and devices on the electric load side such that electric power and signals can be transmitted in a non-contact manner. For example, the power supply system 100 is mounted to a vehicle, but the embodiment is not limited thereto. Referring to the drawings, each configuration of the connector 1 and the power supply system 100 is described in detail below.

Specifically, as illustrated in FIG. 1, the power supply system 100 includes a master-side device 101, a slave-side device 102, and the connector 1. The master-side device 101 is a supply source of electric power to the slave-side device 102. The master-side device 101 corresponds to the above-mentioned device on the power source side, in other words, a device on the power transmitting (power feeding) side. For example, the master-side device 101 includes a power source, such as a battery and a generator, a power distribution function component configured to distribute power from the power source to each unit, and a control function component configured to control power supply and signal communication. The slave-side device 102 is a supply destination of electric power from the master-side device 101. The slave-side device 102 corresponds to the above-mentioned device on the electric load side, in other words, a device on the power reception side. The slave-side device 102 includes various devices driven by electric power from the master-side device 101. The connector 1 is a connection mechanism configured to connect the master-side device 101 and the lave-side device 102 to each other. As described above, the connector 1 in the present embodiment connects the master-side device 101 and the slave-side device 102 to each other such that electric power and signals can be transmitted in a non-contact manner.

The connector 1 in the present embodiment includes a first connector main body 10 and a second connector main body 20. The first connector main body 10 is provided on one side of the master-side device 101 and the slave-side device 102. The second connector main body 20 is provided on the other side of the master-side device 101 and the slave-side device 102. The first connector main body 10 in the present embodiment is provided on the master-side device 101 side, and constitutes a master-side connector main body. The second connector main body 20 in the present embodiment is provided on the slave-side device 102 side, and constitutes a slave-side connector main body. The first connector main body 10 is connected to the master-side device 101 through a power supply line L11, a ground (GND) line L12, and a communication line L13, for example. The second connector main body 20 is connected to the slave-side device 102 through a power supply line L21, a ground (GND) line L22, and a communication line L23, for example. The power supply lines L11 and L21 are routing members for transmitting electric power for driving the units. The ground lines L12 and L22 are routing members for what is called grounding. The communication lines L13 and L23 are routing members for transmitting various kinds of communication signals.

The first connector main body 10 includes a first power transmission coil 11, a first signal transmission coil 12, a first magnetic member 13, a first electronic circuit 14, and a first case 15. The second connector main body 20 includes a second power transmission coil 21, a second signal transmission coil 22, a second magnetic member 23, a second electronic circuit 24, and a second case 25. In addition, the first connector main body 10 and the second connector main body 20 may include a shielding member that is formed of metal material and blocks electromagnetic waves (electromagnetic force) to function as a noise suppression component, except for parts where the first power transmission coil 11, the first signal transmission coil 12, the second power transmission coil 21, and the second signal transmission coil 22 are provided.

The first power transmission coil 11 is a conductor coil capable of transmitting electric power to and from the second power transmission coil 21 in a non-contact manner. The second power transmission coil 21 is a conductor coil capable of transmitting electric power to and from the first power transmission coil 11 in a non-contact manner. In other words, the first power transmission coil 11 and the second power transmission coil 21 can mutually transmit electric power in a non-contact manner. For example, the first power transmission coil 11 and the second power transmission coil 21 may be formed by what is called spiral conductor coils or solenoid (helical) conductor coils. A spiral conductor coil is formed such that a wire having conductivity is wound around a center axis in a spiral manner centered at the center axis. On the other hand, a solenoid conductor coil is formed such that a wire having conductivity is wound around a center axis in a helical manner centered at the center axis. In this case, for example, the first power transmission coil 11 and the second power transmission coil 21 are configured by spiral conductor coils formed by being wound around a center axis C (see FIG. 2, FIG. 3, and FIG. 4) in a spiral manner. The first power transmission coil 11 and the second power transmission coil 21 can transmit electric power in a non-contact manner by various methods, such as electromagnetic induction and electromagnetic resonance, in the state in which the first power transmission coil 11 and the second power transmission coil 21 are opposed to each other. One of the first power transmission coil 11 and the second power transmission coil 21 serves as a power-transmitting coil for transmitting electric power, and the other serves as a power-receiving coil for receiving electric power. In this case, typically, in the first power transmission coil 11 and the second power transmission coil 21, the first power transmission coil 11, which is a master-side coil, serves as a power-transmitting coil, and the second power transmission coil 21, which is a slave-side coil, serves as a power-receiving coil.

The first signal transmission coil 12 is a conductor coil capable of transmitting signals to and from the second signal transmission coil 22 in a non-contact manner. The second signal transmission coil 22 is a conductor coil capable of transmitting signals to and from the first signal transmission coil 12 in a non-contact manner. In other words, the first signal transmission coil 12 and the second signal transmission coil 22 can mutually transmit signals in a non-contact manner (wireless communication). For example, the first signal transmission coil 12 and the second signal transmission coil 22 may be formed by what is called spiral conductor coils or solenoid conductor coils. In this case, for example, the first signal transmission coil 12 and the second signal transmission coil 22 are configured by solenoid conductor coils formed by being wound around the center axis C (see FIG. 2, FIG. 3, and FIG. 4) in a helical manner. The first signal transmission coil 12 and the second signal transmission coil 22 constitute communication antennas configured to radiate (transmit) high-frequency energy to a space as electromagnetic waves (radio waves) and mutually convert (receive) electromagnetic waves (radio waves) in a space into high-frequency energy. The first signal transmission coil 12 and the second signal transmission coil 22 can transmit signals in a non-contact manner by various methods in the state in which the first signal transmission coil 12 and the second signal transmission coil 22 are opposed to each other. One of the first signal transmission coil 12 and the second signal transmission coil 22 serves as a transmitting antenna configured to transmit signals, and the other serves as a receiving antenna configured to receive signals.

The first magnetic member 13 and the second magnetic member 23 are configured to allow magnetic fluxes generated by the first power transmission coil 11 and the second power transmission coil 21 to pass therethrough to enhance the coupling with the opposed first power transmission coil 11 and the opposed second power transmission coil 21, respectively. The first magnetic member 13 and the second magnetic member 23 have another function of preventing the magnetic fluxes from the first power transmission coil 11 and the second power transmission coil 21 from easily reaching the first signal transmission coil 12, the second signal transmission coil 22, and substrates 14A and 24A described later, for example. For example, the first magnetic member 13 and the second magnetic member 23 are formed by mixing and sintering metal materials such as cobalt, nickel, and manganese with iron oxide as main components thereof. For example, the first magnetic member 13 and the second magnetic member 23 are formed into a circular shape. The first magnetic member 13 is provided adjacent to the first power transmission coil 11. The second magnetic member 23 is provided adjacent to the second power transmission coil 21.

The first electronic circuit 14 is a circuit for implementing various functions of the first connector main body 10. Similarly, the second electronic circuit 24 is a circuit for implementing various functions of the second connector main body 20. The first electronic circuit 14 is configured by the substrate 14A (see FIG. 2, FIG. 3, and FIG. 4) and elements (electronic components) mounted on the substrate 14A to exhibit various functions. The first electronic circuit 14 is electrically connected to the first power transmission coil 11, the first signal transmission coil 12, the power supply line L11, the ground line L12, and the communication line L13. The second electronic circuit 24 is configured by the substrate 24A (see FIG. 2 and FIG. 4) and elements (electronic components) mounted on the substrate 24A to exhibit various functions. The second electronic circuit 24 is electrically connected to the second power transmission coil 21, the second signal transmission coil 22, the power supply line L21, the ground line L22, and the communication line L23. For example, the substrates 14A and 24A are formed by busbar plate substrates obtained by covering a printed circuit board (PCB) or a busbar made of conductive metal material serving as a circuit body with insulating resin material and forming the substrates.

In this case, as an example, the first electronic circuit 14 includes a power supply unit 14a, a transceiver 14b, a controller 14c, an inverter 14d, a baseband unit 14e, and a radio frequency (RF/high frequency) circuit 14f. The power supply unit 14a is connected to the power supply line L11, the ground line L12, the control unit 14c, and the transceiver 14b, for example. The power supply unit 14a is supplied with electric power from the master-side device 101 through the power supply line L11, and generates and supplies electric power for operating the transceiver 14b and the controller 14c, for example. The transceiver 14b is connected to the communication line L13 and the controller 14c, for example. The transceiver 14b is configured by a communication circuit for transmitting and receiving electric signals. The controller 14c is connected to the inverter 14d and the baseband unit 14e, for example. The controller 14c controls the units in the first connector main body 10, such as the inverter 14d and the baseband unit 14e, and is configured by an integrated circuit having a microcomputer including a central processing circuit as a main component. The inverter 14d is connected to the power supply line L11 and the first power transmission coil 11, for example. The inverter 14d includes a plurality of switching elements. The inverter 14d converts DC electric power from the power supply line L11 into AC electric power having a predetermined frequency, and supplies the AC electric power to the first power transmission coil 11. On the first electronic circuit 14, a resonant capacitor 14g designed in accordance with a predetermined power transmission frequency is mounted between the inverter 14d and the first power transmission coil 11. On the first electronic circuit 14, an LC resonant circuit is formed by the first power transmission coil 11 and the resonant capacitor 14g. The baseband unit 14e is connected to the controller 14c and the RF circuit 14f, for example, and the RF circuit 14f is connected to the first signal transmission coil 12. The baseband unit 14e and the RF circuit 14f perform various kinds of processing on electric signals used for proximity wireless communication transmitted and received through the first signal transmission coil 12. In the first connector main body 10, power transmission through the first power transmission coil 11 and signal transmission through the first signal transmission coil 12 are controlled by the first electronic circuit 14 configured as described above.

On the other hand, the second electronic circuit 24 includes an AC/DC circuit (rectifier circuit) 24a, a power supply unit 24b, a transceiver 24c, a controller 24d, a baseband unit 24e, and an RF circuit 24f. The AC/DC circuit 24a is connected to the second power transmission coil 21 and the power supply line L21, for example. The AC/DC circuit 24a includes a plurality of rectifier elements (diodes). The AC/DC circuit 24a converts and rectifies received AC electric power, which has been transmitted from the first connector main body 10 through the first power transmission coil 11 and the second power transmission coil 21, into DC electric power, and supplies the DC electric power to the slave-side device 102 through the power supply line L21, for example. On the second electronic circuit 24, a resonant capacitor 24g designed in accordance with a predetermined power transmission frequency is mounted between the second power transmission coil 21 and the AC/DC circuit (rectifier circuit) 24a. On the second electronic circuit 24, an LC resonant circuit is formed by the second power transmission coil 21 and the resonant capacitor 24g. Furthermore, in the second electronic circuit 24, a current monitor 24h and a voltage monitor 24i are connected to the power supply line L21. The current monitor 24h and the voltage monitor 24i detect a current value and a voltage value of electric power supplied to the slave-side device 102 from the AC/DC circuit 24a through the power supply line L21 and output the detected current value and the detected voltage value to the controller 24d, respectively. In the second electronic circuit 24, a smoothing capacitor 24j is mounted on the side of the AC/DC circuit (rectifier circuit) 24a closer to the power supply line L21. The power supply unit 24b is connected to the power supply line L21, the AC/DC circuit 24a, the controller 24d, and the transceiver 24c, for example. The power supply unit 24b is supplied with DC electric power converted by the AC/DC circuit 24a, and generates and supplies electric power for operating the transceiver 14b and the controller 24d, for example. The transceiver 24c is connected to the communication line L23 and the controller 24d, for example. The transceiver 24c is configured by a communication circuit for transmitting and receiving electric signals. The controller 24d is connected to the baseband unit 24e, for example. The controller 24d controls the units in the second connector main body 20, such as the baseband unit 24e, and is configured by an integrated circuit having a microcomputer including a central processing circuit as a main component. The baseband unit 24e is connected to the controller 24d and the RF circuit 24f, for example, and the RF circuit 24f is connected to the second signal transmission coil 22. The baseband unit 24e and the RF circuit 24f perform various kinds of processing on electric signals used for proximity wireless communication transmitted and received through the second signal transmission coil 22. In the second connector main body 20, power transmission through the second power transmission coil 21 and signal transmission through the second signal transmission coil 22 are controlled by the second electronic circuit 24 configured as described above.

The first case 15 and the second case 25 are cases to which the units in the first connector main body 10 and the second connector main body 20 are assembled, respectively. The first case 15 is a first casing in which the first power transmission coil 11, the first signal transmission coil 12, the first magnetic member 13, and the substrate 14A constituting the first electronic circuit 14 are provided. The second case 25 is a second casing in which the second power transmission coil 21, the second signal transmission coil 22, the second magnetic member 23, and the substrate 24A constituting the second electronic circuit 24 are provided. For example, the first case 15 and the second case 25 are formed from resin material having insulating property. In the first electronic circuit 14 constituted by the substrate 14A and the second electronic circuit 24 constituted by the substrate 24A, a part of the configurations may be provided outside the first case 15 and the second case 25, respectively.

Figure 2:
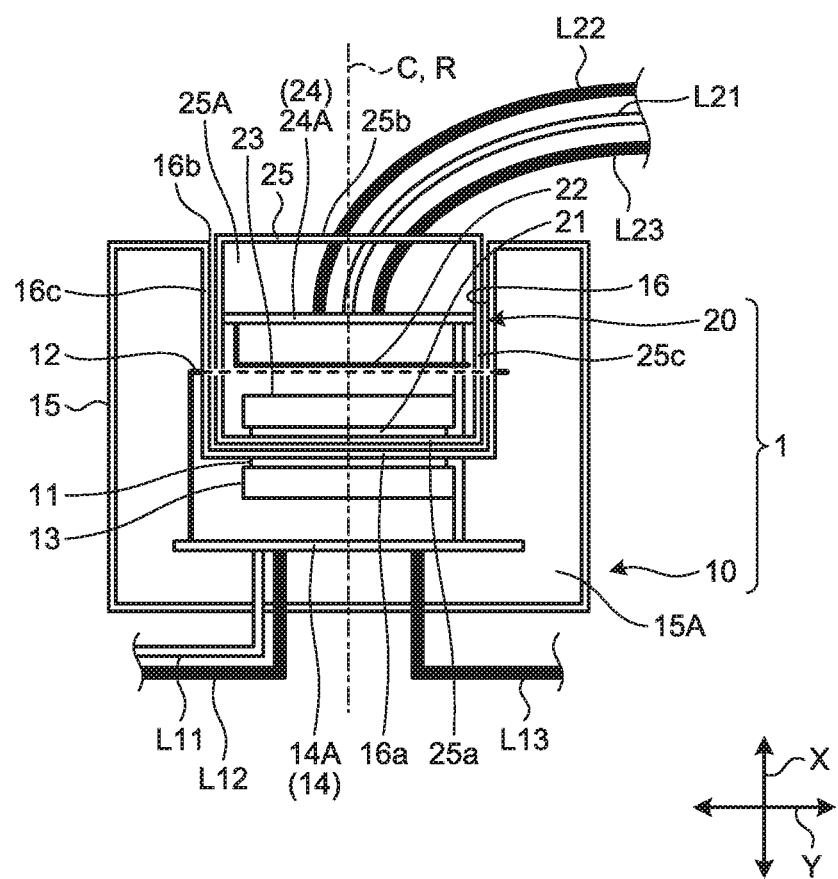
FIG. 2 is a schematic cross-sectional view illustrating a schematic configuration of a connector included in the power supply system according to the embodiment.

As illustrated in FIG. 2, FIG. 3, and FIG. 4, the first case 15 and the second case 25 in the present embodiment are configured to be mutually fittable. In the first connector main body 10 and the second connector main body 20 in the present embodiment, the first case 15 and the second case 25 can relatively rotate about a rotation axis R along the fitting direction with a positional relation that the first power transmission coil 11 and the second power transmission coil 21 are opposed to each other and the first signal transmission coil 12 and the second signal transmission coil 22 are opposed to each other in the state in which the first case 15 and the second case 25 are mutually fitted.

Specifically, one of the first case 15 and the second case 25 has a fitting recess 16, and the other of the first case 15 and the second case 25 is formed to be fittable into the fitting recess 16. The fitting recess 16 in the present embodiment is provided in the first case 15, and the second case 25 is formed to be fittable into the fitting recess 16.

The fitting recess 16 is formed as a space portion having a columnar shape centered around a center axis C. The fitting recess 16 is a space portion into which the second case 25 can be fitted. Typically, the center axis C is substantially aligned with the above-mentioned center axes C of the first power transmission coil 11, the first signal transmission coil 12, the second power transmission coil 21, and the second signal transmission coil 22. The fitting direction of the first case 15 and the second case 25 is a direction along the center axis C. The rotation axis R of the relative rotation of the first case 15 and the second case 25 is substantially aligned with the center axis C. Specifically, in the first case 15, the fitting recess 16 is formed into a columnar shape having the center axis C that is the rotation axis R. In the following description, the direction along the center axis C is sometimes referred to as "axial direction X", and a direction orthogonal to the axial direction X is sometimes referred to as "radial direction Y". The above-mentioned fitting direction corresponds to the axial direction X.

The first case 15 is formed into a box shape in which a housing space portion 15A is formed, and the above-mentioned fitting recess 16 is formed in the outer surface of the box shape so as to have a columnar recessed shape. The first case 15 houses the first power transmission coil 11, the first signal transmission coil 12, the first magnetic member 13, and the substrate 14A in the housing space portion 15A. The first power transmission coil 11, the first signal transmission coil 12, the first magnetic member 13, and the substrate 14A are positioned and held in the housing space portion 15A through holding members, for example. The first power transmission coil 11, the first signal transmission coil 12, the first magnetic member 13, and the substrate 14A may be fixed to the units through adhesive, for example. The first power transmission coil 11 is located in the housing space portion 15A so as to be opposed to a bottom portion 16a of the fitting recess 16 along the axial direction X. The bottom portion 16a is an end surface (bottom surface) of the innermost part of the fitting recess 16 on one side in the axial direction X, and is a surface opposed to an opening 16b through which the second case 25 is inserted along the axial direction X. The first signal transmission coil 12 is located in the housing space portion 15A so as to be wound around an outer peripheral surface of a side portion 16c of the fitting recess 16 on the outer side of the side portion 16c in the radial direction Y. The side portion 16c is a surface of the fitting recess 16 along the axial direction X, and is a part constituting a curve surface of the cylindrical shape. The first magnetic member 13 is located in the housing space portion 15A on one side of the first power transmission coil 11 in the axial direction X, in this case, on the side opposite to the first signal transmission coil 12, so as to be adjacent to the first power transmission coil 11. In other words, the first magnetic member 13 is located in the housing space portion 15A on the side opposite to the first signal transmission coil 12 across the first power transmission coil 11 in the axial direction X. The first magnetic member 13 is located such that the thickness direction thereof is aligned with the axial direction X. The substrate 14A is located in the housing space portion 15A on one side of the first magnetic member 13 in the axial direction X, in this case, on the side opposite to the first power transmission coil 11, with a gap from the first magnetic member 13. In other words, the substrate 14A is located in the housing space portion 15A on the side opposite to the first power transmission coil 11 across the first magnetic member 13 in the axial direction X. Specifically, the above-mentioned first magnetic member 13 is located between the first power transmission coil 11 and the substrate 14A in the axial direction X. In the first connector main body 10, as described above, the substrate 14A, the first magnetic member 13, the first power transmission coil 11, and the first signal transmission coil 12 are arranged in the housing space portion 15A in this order from one side to the other side along the axial direction X, and the units are located coaxially about the center axis C.

The second case 25 is formed into a tubular shape in which a housing space portion 25A is formed. The second case 25 is formed into a cylindrical shape which is fittable into the fitting recess 16 and has the center axis C that is the rotation axis R. Both end portions 25a and 25b of the second case 25 in the axial direction X constitute closed end surfaces, and a side portion 25c thereof along the axial direction X constitutes a curve surface of the cylindrical shape. The second case 25 houses the second power transmission coil 21, the second signal transmission coil 22, the second magnetic member 23, and the substrate 24A in the housing space portion 25A. The second power transmission coil 21, the second signal transmission coil 22, the second magnetic member 23, and the substrate 24A are positioned and held in the housing space portion 25A through holding members, for example. The second power transmission coil 21, the second signal transmission coil 22, the second magnetic member 23, and the substrate 24A may be fixed to the units through adhesive, for example. The second power transmission coil 21 is located in the housing space portion 25A so as to be opposed to the end portion 25a of the second case 25 along the axial direction X. The end portion 25a is an end portion of the second case 25 on one side in the axial direction X, and is a surface opposed to the end portion 25b through which the power supply line L21, the ground line L22, and the communication line L23, for example, are inserted along the axial direction X. The second signal transmission coil 22 is located in the housing space portion 25A so as to be wound around an inner peripheral surface of the side portion 25c of the second case 25 on the inner side of the side portion 25c in the radial direction Y. The second magnetic member 23 is located in the housing space portion 25A on one side of the second power transmission coil 21 in the axial direction X, in this case, on the second signal transmission coil 22 side, so as to be adjacent to the first power transmission coil 11. In other words, the second magnetic member 23 is located in the housing space portion 15A between the second power transmission coil 21 and the second signal transmission coil 22 in the axial direction X. The second magnetic member 23 is located such that the thickness direction thereof is the axial direction X. The substrate 24A is located in the housing space portion 25A on one side of the second magnetic member 23 in the axial direction X, in this case, on the side opposite to the second power transmission coil 21, with a gap from the second magnetic member 23. Specifically, the above-mentioned second magnetic member 23 is located between the second power transmission coil 21 and the substrate 24A in the axial direction X. More specifically, the substrate 24A is located in the housing space portion 25A on the second signal transmission coil 22 on the side opposite to the second magnetic member 23 in the axial direction X with a gap from the second signal transmission coil 22. In the second connector main body 20, as described above, the substrate 24A, the second signal transmission coil 22, the second magnetic member 23, and the second power transmission coil 21 are arranged in the housing space portion 25A in this order from one side to the other side along the axial direction X, and the units are located coaxially about the center axis C.

In the first connector main body 10 and the second connector main body 20 configured as described above, substantially the entire second case 25 is located in the fitting recess 16 in the state in which the fitting recess 16 in the first case 15 and the second case 25 are mutually fitted (hereinafter sometimes simply referred to as "fitted state"). In the first connector main body 10 and the second connector main body 20, the first case 15 and the second case 25 are held in the fitted state. In the first case 15 and the second case 25, in the fitted state, the bottom portion 16a and the end portion 25a are opposed to each other along the axial direction X, and the opposed bottom portion 16a and end portion 25a both extend along the radial direction Y. In the first case 15 and the second case 25, in the fitted state, the side portion 16c and the side portion 25c are opposed to each other in the radial direction Y such that the side portion 16c is located on the outer side and the side portion 25c is located on the inner side, and the opposed side portion 16c and side portion 25c both extend along the axial direction X.

In the first connector main body 10 and the second connector main body 20, the positions of the first power transmission coil 11 and the second power transmission coil 21 are set so as to have a positional relation that the first power transmission coil 11 and the second power transmission coil 21 are opposed to each other along the axial direction X in the fitted state. In the fitted state, the first power transmission coil 11 and the second power transmission coil 21 are located so to be opposed to each other along the axial direction X across the bottom portion 16a of the fitting recess 16 and the end portion 25a of the second case 25. With this configuration, in the first connector main body 10 and the second connector main body 20, a coupling axial direction in which electromagnetic field of the first power transmission coil 11 and electromagnetic field of the second power transmission coil 21 are coupled during power transmission (hereinafter sometimes referred to as "power transmission coupling axial direction") is aligned with a direction along the axial direction X.

In the first connector main body 10 and the second connector main body 20, the positions of the first signal transmission coil 12 and the second signal transmission coil 22 are set so as to have a positional relation that the first signal transmission coil 12 and the second signal transmission coil 22 are opposed to each other along the radial direction Y in the fitted state. In the fitted state, the first signal transmission coil 12 and the second signal transmission coil 22 are opposed to each other along the radial direction Y across the side portion 16c of the fitting recess 16 and the side portion 25c of the second case 25, and the second signal transmission coil 22 is located on the inner side of the first signal transmission coil 12. With this configuration, in the first connector main body 10 and the second connector main body 20, a coupling axial direction in which electromagnetic field of the first signal transmission coil 12 and electromagnetic field of the second signal transmission coil 22 are coupled during power transmission (hereinafter sometimes referred to as "signal transmission coupling axial direction") is along with a direction along the radial direction Y.

The first connector main body 10 and the second connector main body 20 are configured as described above, and hence the power transmission coupling axial direction and the signal transmission coupling axial direction are different directions and, in this case, have a positional relation of being orthogonal to each other. In other words, in the first connector main body 10 and the second connector main body 20, the first power transmission coil 11, the first signal transmission coil 12, the second power transmission coil 21, and the second signal transmission coil 22 are disposed so as to have a positional relation that the power transmission coupling axial direction and the signal transmission coupling axial direction are orthogonal to each other. With this configuration, the first connector main body 10 and the second connector main body 20 can relatively enhance the coupling between the first power transmission coil 11 and the second power transmission coil 21 during bower transmission and the coupling between the first signal transmission coil 12 and the second signal transmission coil 22 during signal transmission. Then, with this configuration, the first connector main body 10 and the second connector main body 20 can relatively weaken the coupling between the first power transmission coil 11 or the second power transmission coil 21 and the first signal transmission coil 12 or the second signal transmission coil 22. As a result, the first connector main body 10 and the second connector main body 20 can achieve efficient power transmission and high-quality signal transmission.

The first connector main body 10 and the second connector main body 20 are configured as described above, and hence, in the fitted state, the first case 15 and the second case 25 can relatively rotate about the rotation axis R (center axis C) while maintaining the fitted state.

In the connector 1 and the power supply system 100 described above, the first connector main body 10 includes the first power transmission coil 11, the first signal transmission coil 12, and the first case 15, and the second connector main body 20 includes the second power transmission coil 21, the second signal transmission coil 22, and the second case 25. The connector 1 has a positional relation that, in the state in which the first case 15 and the second case 25 are mutually fitted, the first power transmission coil 11 and the second power transmission coil 21 are opposed and the first signal transmission coil 12 and the second signal transmission coil 22 are opposed to each other. With this configuration, in the connector 1, the first power transmission coil 11 and the second power transmission coil 21 can mutually transmit electric power in a non-contact manner, and the first signal transmission coil 12 and the second signal transmission coil 22 can mutually transmit signals in a non-contact manner. In this configuration, in the connector 1, the first case 15 and the second case 25 can relatively rotate about the rotation axis R along the fitting direction in the state in which the first case 15 and the second case 25 are mutually fitted. With this configuration, in the connector 1, even when the fitting direction of the first case 15 and the second case 25 is not adjusted or the first case 15 and the second case 25 are not positioned, the first connector main body 10 and the second connector main body 20 can be easily connected such that electric power and signals can be transmitted. Specifically, the connector 1 can implement the configuration capable of non-contact power feeding and wireless communication between the master-side device 101 side and the slave-side device 102 side by simply fitting the second case 25 into the fitting recess 16 without adjusting the fitting direction of the first case 15 and the second case 25 or positioning the first case 15 and the second case 25. As a result, the connector 1 and the power supply system 100 can improve the assemblability.

The connector 1 and the power supply system 100 described above can suppress noise discharge to the outside in signal transmission between the first signal transmission coil 12 and the second signal transmission coil 22 by employing proximity wireless communication such as NFC having a short communication distance (for example, about 10 mm or less). By using this feature, for example, the connector 1 can be configured to prevent communication contents of the signal transmission between the first signal transmission coil 12 and the second signal transmission coil 22 from being easily intercepted from the outside by securing the depth (length along axial direction X) of the fitting recess 16 in the first case 15 to be sufficiently longer than the above-mentioned communication distance. In the connector 1, even when the first case 15 and the second case 25 relatively rotate in the state in which the first case 15 and the second case 25 are fitted and power transmission between the first power transmission coil 11 and the second power transmission coil 21 and signal transmission between the first signal transmission coil 12 and the second signal transmission coil 22 are being performed, the power transmission and the signal transmission can be continued. The connector 1 can have a configuration in which electrical contact portions are not exposed to the outside of the first case 15 and the second case 25 and hence can be configured to easily secure appropriate water-proof performance with a simple configuration.

In this case, in the connector 1 and the power supply system 100 described above, the first case 15 has the fitting recess 16 formed into a columnar shape having the center axis C that is the rotation axis R, and the second case 25 is formed into a cylindrical shape which is fittable into the fitting recess 16 and has the center axis C that is the rotation axis R. With this configuration, in the connector 1, the first case 15 and the second case 25 can have shapes having no directionality about the rotation axis R (center axis C). As a result, as described above, the connector 1 and the power supply system 100 can achieve the configuration in which the first case 15 and the second case 25 can relatively rotate about the rotation axis R in the state in which the first case 15 and the second case 25 are fitted, thus improving the assemblability.

Furthermore, in the connector 1 and the power supply system 100 described above, the second connector main body 20 has the second magnetic member 23 located between the second power transmission coil 21 and the second signal transmission coil 22 in the axial direction X (fitting direction). As a result, in signal transmission between the first signal transmission coil 12 and the second signal transmission coil 22, the connector 1 can reduce the influence of noise generated by power transmission between the first power transmission coil 11 and the second power transmission coil 21. As a result, the connector 1 and the power supply system 100 can appropriately transmit power by the first power transmission coil 11 and the second power transmission coil 21 and then suppress the reduction in quality of signal transmission between the first signal transmission coil 12 and the second signal transmission coil 22.

The connector and the power supply system according to the embodiment of the present invention described above are not limited to the above-mentioned embodiment, and can be variously changed within the scope of claims.

In the above description, the fitting recess 16 is provided in the first case 15, and the second case 25 is formed to be fittable into the fitting recess 16, but the configuration is not limited thereto. The fitting recess 16 may be provided in the second case 25, and the first case 15 may be formed to be fittable into the fitting recess 16. In this case, for example, the first connector main body 10 and the second connector main body 20 are disposed such that the first power transmission coil 11 and the second power transmission coil 21 switch places, the first signal transmission coil 12 and the second signal transmission coil 22 switch places, the first magnetic member 13 and the second magnetic member 23 switch places, and the substrate 14A and the substrate 24A switch places.

In the above description, the center axes C of the fitting recess 16 and the second case 25 are aligned with the center axes C of the first power transmission coil 11, the first signal transmission coil 12, the second power transmission coil 21, and the second signal transmission coil 22, but the embodiment is not limited thereto, and the center axes C may be slightly eccentric with each other.

In the connector and the power supply system according to the present embodiment, the first connector main body includes the first power transmission coil, the first signal transmission coil, and the first case, and the second connector main body includes the second power transmission coil, the second signal transmission coil, and the second case. The connector has a positional relation that, in the state in which the first case and the second case are mutually fitted, the first power transmission coil and the second power transmission coil are opposed to each other, and the first signal transmission coil and the second signal transmission coil are opposed to each other. With this configuration, in the connector, the first power transmission coil and the second power transmission coil can mutually transmit electric power in a non-contact manner, and the first signal transmission coil and the second signal transmission coil can mutually transmit signals in a non-contact manner. In this configuration, in the connector, the first case and the second case can relatively rotate about the rotation axis along the fitting direction in the state in which the first case and the second case are mutually fitted. With this configuration, in the connector, even when the fitting direction of the first case and the second case is not adjusted or the first case and the second case are not positioned, the first connector main body and the second connector main body can be easily connected such that electric power and signals can be transmitted. As a result, the connector and the power supply system have an effect that the assemblability can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector, comprising:
a first connector main body including
a first power transmission coil capable of transmitting electric power in a non-contact manner,
a first signal transmission coil capable of transmitting a signal in a non-contact manner, and
a first case in which the first power transmission coil and the first signal transmission coil are provided; and
a second connector main body including
a second power transmission coil capable of transmitting electric power to and from the first power transmission coil in a non-contact manner,
a second signal transmission coil capable of transmitting a signal to and from the first signal transmission coil in a non-contact manner, and
a second case in which the second power transmission coil and the second signal transmission coil are provided and which is fittable into the first case, wherein
in the first connector main body and the second connector main body, the first case and the second case are relatively rotatable about a rotation axis along a fitting direction, which is an axial direction, with a positional relation that the first power transmission coil and the second power transmission coil are opposed to each other and the first signal transmission coil and the second signal transmission coil are opposed to each other in a state in which the first case and the second case are mutually fitted,
the first power transmission coil, the first signal transmission coil, the second power transmission coil, and the second signal transmission coil are disposed so as to have a positional relation that a power transmission coupling axial direction and a signal transmission coupling axial direction are orthogonal to each other,
the first power transmission coil and the second power transmission coil are opposed to each other in the axial direction along the fitting direction, with the power transmission coupling axial direction being in the axial direction, and
the first signal transmission coil and the second signal transmission coil are opposed to each other in a radial direction, with the signal transmission coupling axial direction being in the radial direction.

2. The connector according to claim 1, wherein
one of the first case and the second case has a fitting recess formed into a columnar shape having a center axis that is the rotation axis, and
the other of the first case and the second case is formed into a cylindrical shape which is fittable to the fitting recess and has a center axis that is the rotation axis.

3. The connector according to claim 2, wherein
the one of the first case and the second case is the first case,
the other of the first case and the second case is the second case, and
the second connector main body includes a magnetic member provided to the second case and located between the second power transmission coil and the second signal transmission coil in the fitting direction.

4. A power supply system, comprising:
a master-side device, which is a supply source of electric power;
a slave-side device, which is a supply destination of electric power from the master-side device; and
a connector configured to connect the master-side device and the slave-side device, wherein
the connector includes:
a first connector main body including
a first power transmission coil capable of transmitting electric power in a non-contact manner,
a first signal transmission coil capable of transmitting a signal in a non-contact manner, and
a first case in which the first power transmission coil and the first signal transmission coil are provided, the first connector main body being provided on one side of the master-side device and the slave-side device; and a second connector main body including
- a second power transmission coil capable of transmitting electric power to and from the first power transmission coil in a non-contact manner,
- a second signal transmission coil capable of transmitting a signal to and from the first signal transmission coil in a non-contact manner, and
- a second case in which the second power transmission coil and the second signal transmission coil are provided, the second connector main body being provided on the other side of the master-side device and the slave-side device, and in the first connector main body and the second connector main body, the first case and the second case are relatively rotatable about a rotation axis along a fitting direction, which is an axial direction, with a positional relation that the first power transmission coil and the second power transmission coil are opposed to each other and the first signal transmission coil and the second signal transmission coil are opposed to each other in a state in which the first case and the second case are mutually fitted, the first power transmission coil, the first signal transmission coil, the second power transmission coil, and the second signal transmission coil are disposed so as to have a positional relation that a power transmission coupling axial direction and a signal transmission coupling axial direction are orthogonal to each other, the first power transmission coil and the second power transmission coil are opposed to each other in the axial direction along the fitting direction, with the power transmission coupling axial direction being in the axial direction, and the first signal transmission coil and the second signal transmission coil are opposed to each other in a radial direction, with the signal transmission coupling axial direction being in the radial direction.

* * * * *